April 12, 1966  E. E. DENZIN  3,245,230
TORQUE LIMITING CLUTCH HAVING POSITIONABLE CONTROL MEANS
Filed Aug. 6, 1964  2 Sheets-Sheet 1

Erwin E. Denzin
INVENTOR.

BY Clarence A. O'Brien
and Harvey B. Jackson
Attorneys

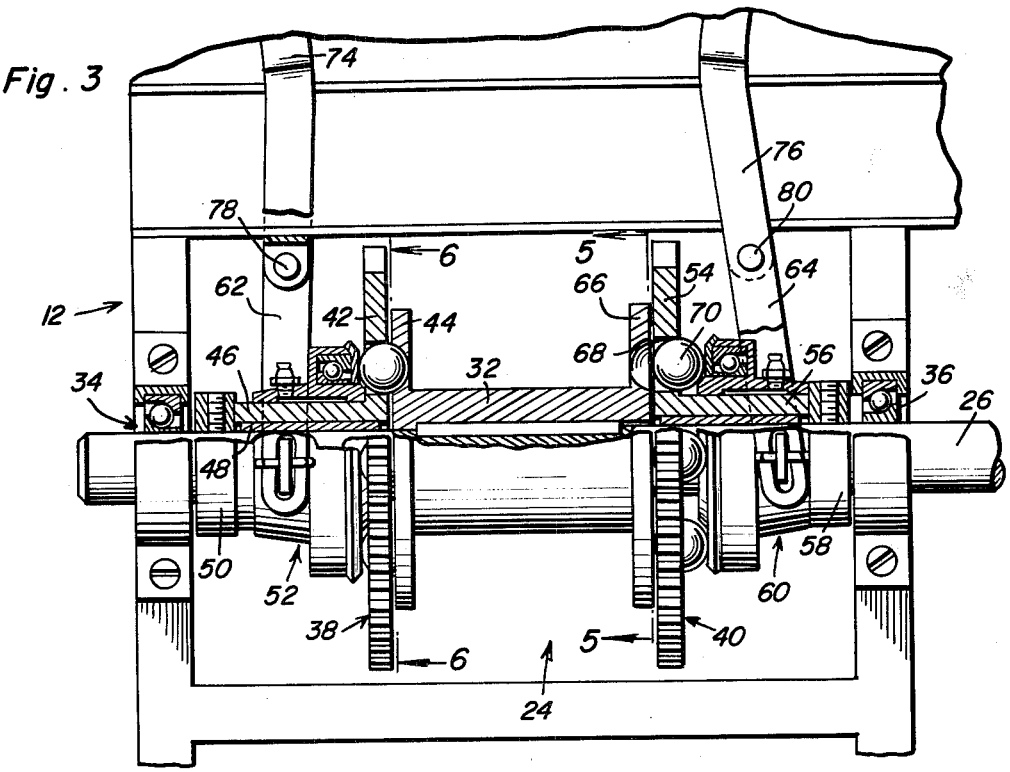

United States Patent Office 3,245,230
Patented Apr. 12, 1966

3,245,230
TORQUE LIMITING CLUTCH HAVING POSITIONABLE CONTROL MEANS
Erwin E. Denzin, Rte. 2, Waupun, Wis.
Filed Aug. 6, 1964, Ser. No. 387,845
6 Claims. (Cl. 64—29)

This invention relates to a drive controlling clutch device through which the transmission of torque may be limited and more particularly to a two speed control clutch having adjustable overload release facilities.

A primary object of the present invention, is to provide a clutch device through which a load may be driven at different speed ratios, with facilities for limiting the torque respectively transmitted at each of the speed ratios.

An additional object of the present invention is to provide a clutch controlled change speed transmission and control means therefor whereby the torque transmitted may be limited by different amounts at each drive ratio.

In accordance with the foregoing objects, the clutch control transmission of the present invention may be selectively engaged to transmit power and will automatically release upon overload without damage to the transmission and without any unintentional change in the speed ratio.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged partial view of the clutch mechanism with parts shown in section.

FIGURE 4 is a partial sectional view taken substantially through a plane indicated by section line 4—4 in FIGURE 1.

FIGURE 5 is a sectional view taken substantially through a plane indicated by section line 5—5 in FIGURE 3.

FIGURE 6 is a sectional view taken substantially through a plane indicated by section line 6—6 in FIGURE 3.

Figure 1:
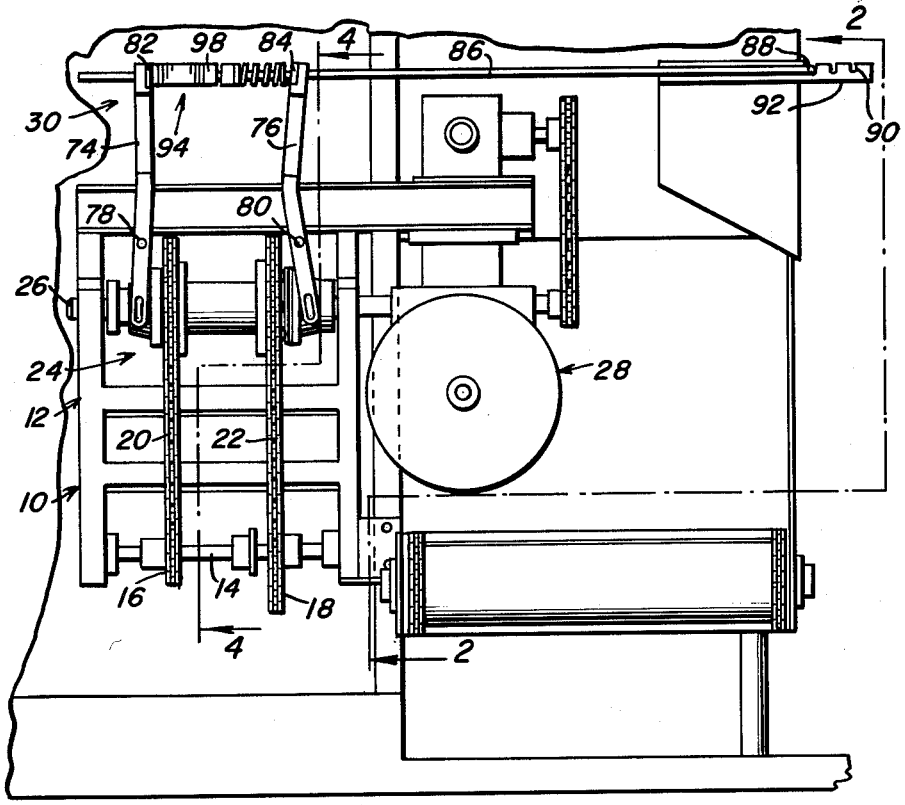
FIGURE 1 is a front elevational view of the clutch control transmission of the present invention in one typical installation.

Referring now to the drawings in detail, the transmission generally denoted by reference numeral 10 is illustrated in FIGURE 1 in association with material handling equipment adapted to be driven through the transmission at two different speeds. A mounting frame assembly 12 of any suitable type is therefore provided and adapted to be secured to the equipment with which the transmission is associated in order to provide adequate support for the elements of the transmission. The power input to the transmission is therefore applied to a jack shaft 14 rotatably supported by the frame assembly. Secured to the jack shaft in axially spaced relation to each other, are a pair of sprocket gears 16 and 18. Entrained about each of the sprocket gears on the jack shaft, are endless sprocket chains 20 and 22 through which rotation may be continuously imparted at two different speeds to the clutch mechanism generally referred to by reference numeral 24. Accordingly, the clutch mechanism is mounted on a driven shaft 26 journaled by the frame assembly 12 in vertically spaced, parallel relation to the jack shaft 14. The driven shaft 26 may be driven at two different speeds in order to transmit drive to the load through a worm and worm wheel drive mechanism 28. The clutch mechanism 24 controls the output speed of the shaft 26 and automatically releases upon overload. The speed control of the clutch mechanism and the torque limit associated with overload release, is regulated by selectively positioned control means generally referred to by reference numeral 30.

Referring now to FIGURE 3 in particular, it will be observed that the clutch mechanism includes a driven sleeve member 32 secured to the driven shaft 26 in any suitable manner for rotation therewith and axially positioned thereon centrally between the spaced supporting bearing units 34 and 36 for the driven shaft. The driven member 32 axially spaces a pair of drive members 38 and 40 respectively driven at different speeds by the sprocket chains 20 and 22 aforementioned. Accordingly, the drive member 38 includes an externally toothed flange portion 42 disposed in abutting relation to the flange portion 44 secured to one axial end of the driven member 32. The drive member 38 also includes an axially elongated sleeve portion 46 rotatably mounted on the driven shaft by the sleeve bearing 48. A thrust collar 50 is secured to the driven shaft abutting the axial end of the sleeve portion 46 of the drive member 38 so as to hold the drive member in axially assembled position on the driven shaft as well as to limit axial displacement of a thrust bearing assembly 52 slidably mounted on the sleeve portion 46 of the drive member. The drive member 40 is similar in construction to the drive member 38 and hence also includes an externally toothed flange portion 54 connected to an axially elongated sleeve portion 56 held assembled on the driven shaft by the thrust collar 58. Also slidably mounted on the sleeve portion 56 of the drive member 40, is a second thrust bearing assembly 60. Each of the thrust bearing assemblies 52 and 60 is of conventional construction and is adapted to be axially displaced by shifting arm 62 or 64.

The thrust bearing assemblies form part of axially displaceable locking means through which either the drive member 38 is coupled to the flange portion 44 of the driven member 32 or the drive member 40 is coupled to the flange portion 66 of the driven member 32 at the axially opposite end from the flange portion 44. Accordingly, each of the drive members is provided with a plurality of circumferentially spaced openings 68 through which a plurality of locking ball elements 70 are axially displaceable into circumferentially spaced pockets 72 formed in the opposite flange portions 44 and 66 of the driven member. It will therefore be apparent, that the flange portions 42 and 54 of the drive members constitute carriers for the locking ball elements 70 through which the drive member may be coupled to the driven member 32. The locking ball elements are therefore axially displaced into the pockets 68 by the thrust bearing assemblies 52 and 60. Accordingly, either the drive member 38 or the drive member 40 may be coupled to the driven member for drive of the driven shaft at different speeds depending upon which of the shifting arms 62 or 64 has been angularly displaced to an operative position holding its associated thrust bearing assembly in engagement with the locking elements. As illustrated in FIGURE 3, the drive member 38 is coupled to the driven member whereas the drive member 40 is disengaged therefrom. The driven shaft 26 will therefore be driven at a speed corresponding to the speed at which the drive member 38 is continuously driven. Should overload occur while power is being transmitted at the speed corresponding to the drive member 38, the locking elements 70 will cam the thrust bearing assembly 52 against the axial bias imposed thereon by the shifting arm 62 and thus uncouple the drive member 38 from the driven member until the overload condition is removed.

Figure 2:
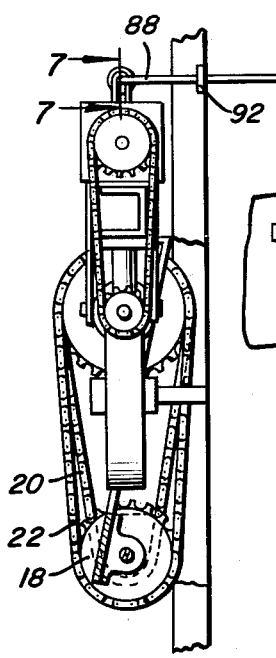
FIGURE 2 is a side elevational view of the transmission shown in FIGURE 1.
Figure 7:
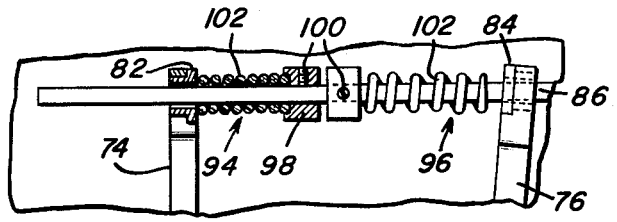
FIGURE 7 is an enlarged partial sectional view taken substantially through a plane indicated by section line 7—7 in FIGURE 2.

The shifting arms 62 and 64 are respectively connected to actuating lever elements 74 and 76 for angular displacement about fixed axes extending through the pivots 78 and 80. As more clearly seen in FIGURES 1, 2 and 7, the upper ends of the actuating lever elements are provided with pressure bearing collars 82 and 84 through which a control rod 86 loosely extends. One end portion 88 of the control rod may be received within detent notches 90 formed in a fixed control plate 92 so as to hold the control rod in two operative positions and an intermediate neutral position. In the operative positions of the control rod, the actuating lever elements 74 or 76 are angularly displaced to positions wherein the shifting arms associated therewith yieldably maintain one or the other of the drive members coupled to an associated flange portion of the driven member 32. Accordingly, a pair of spring devices 94 and 96 are adjustably positioned on the control rod in order to regulate the pressure with which the respective actuating elements hold the clutch in engagement. In this manner, the overload torque limit may be set for each of the drive speed ratios of the transmission. Each of the spring devices includes therefore, a torque regulating adjustment collar 98 secured in adjusted position on the control rod by a setscrew element 100. One axial end of a spring member 102 abuts the adjustment collar while the opposite axial end of the spring member is displaced by the control rod into engagement with one of the pressure collars 82 or 84. As shown in FIGURES 1 and 7, the spring device 94 is held by the control rod in engagement with the collar 82 of the actuating element 74 in order to yieldably hold the drive member 38 locked to the driven member 32 as illustrated in FIGURE 3. The limit on the amount of torque capable of being transmitted through the transmission when the drive member 38 is in engagement with the driven member will therefore depend upon the axial position of the spring device 94 on the control rod. Separate adjustment of the control device 96 will correspondingly regulate the torque limit associated with drive of the driven shaft 26 when the driven member is engaged with the drive member 40. It will of course also be apparent that when the control rod 86 is disposed in its intermediate neutral position, neither of the spring devices 94 and 96 will be in engagement with the actuating elements so that the transmission will be in a neutral condition.

From the foregoing description, the operation, construction and utility of the transmission of the present invention and in particular the two speed overload clutch mechanism and control therefor will be apparent. It will therefore be appreciated, that the principles associated with the clutch controlled transmission of the present invention will be adaptable for various installations wherein both a change in speed is required as well as regulation of the torque limit associated with the respective speeds.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An overload speed changing clutch comprising, a driven shaft, a pair of drive members rotatably mounted on the driven shaft in axially spaced relation to each other and adapted to be driven at different speeds, a sleeve secured to the driven shaft between said drive members having flanges at opposite axial ends thereof, each of said flanges being provided with circumferentially spaced pockets, a plurality of ball elements carried by each of said drive members and axially displaceable into the pockets in the flanges to lock one of the drive members to the sleeve, thrust-bearing means slidably mounted on each of the drive members for axial displacement of the ball elements into said pockets, thrust collars secured to said driven shaft holding the drive members in axially assembled relation on the driven shaft and limiting slidable displacement of the bearing means, operating means engageable with said thrust-bearing means for displacement of the ball elements, a control rod, and spring means operatively mounted on the control rod for exerting pressure on the operating means to selectively lock one of the drive members to the sleeve in response to positioning of the control rod.

2. The combination of claim 1 wherein said spring means includes a pair of spring members mounted on the control rod, a pair of adjusting collars secured to the control rod in abutting relation to adjacent axial ends of said spring members, the opposite remote ends of the spring members being displaceable with the control rod into engagement with the operating means for exerting pressure thereon in one selected direction, said operating means including a pair of lever elements respectively connected to the thrust-bearing means on each of the drive members.

3. An overload control clutch device comprising, a drivein shaft, a pair of drive members rotatably mounted on said shaft, a driven member secured to the shaft and axially spacing the drive members thereon, axially displaceable locking means mounted on the drive members for engagement with the driven member, and selectively positioned control means operatively connected to the locking means for yieldably holding the locking means in engagement with the driven member to couple one of the drive members thereto, said control means comprising, a pair of movably mounted actuating elements engageable with the locking means for displacement thereof, a control rod, means for holding the control in a plurality of operative positions and a neutral position, and spring means positioned on the control rod for alternative engagement with the actuating element in the operative positions of the control rod.

4. An overload control clutch device comprising, a driven shaft, a pair of drive members rotatably mounted on said shaft, a driven member secured to the shaft and axially spacing the drive members thereon, axially displaceable locking means mounted on the drive members for engagement with the driven member, and selectively positioned control means operatively connected to the locking means for yieldably holding the locking means in engagement with the driven member to couple one of the drive members thereto, said selectively positioned control means comprising, a pair of pivotally mounted actuating elements operatively connected to the displaceable locking means, a slidably mounted rod having two operative positions and an intermediate neutral position, and a pair of spring devices adjustably positioned on said rod between the actuating elements for alternative engagement therewith when the rod is positioned to said two operative positions.

5. The combination of claim 4 wherein each of said drive members comprises, a gear member having an externally toothed flange in abutting relation to the driven member and an axially elongated sleeve portion slidably mounting the displaceable locking means.

6. An overload transmission control device comprising, a driven member, means rotatably mounting said driven member, at least two drive members rotatably mounted in axially fixed relation to said driven member, axially displaceable coupling means interengageable between each of said drive members and the driven member for rotatively coupling one of the drive members to the driven member, actuating means engageable with said coupling means for exerting an engaging force resisting axial displacement of the coupling means in a disengaging direction, a control member movably mounted relative to the driven member, means for holding the control member in a plurality of operative positions, spring means mounted on the control member for engagement with the actuating means in each of the operative positions of the control member, and torque regulating means adjustably positioning the spring means on the control member for regulating said engaging force exerted on the coupling means to control displacement of the coupling means in said disengaging direction under overload conditions.

References Cited by the Examiner

UNITED STATES PATENTS

| | | | |
|---|---|---|---|
| 773,951 | 11/1904 | MacGregor et al. | 192—51 |
| 1,184,082 | 5/1916 | Dawson | 192—48 |
| 1,685,519 | 9/1928 | Bjorge | 254—187 |
| 2,375,020 | 5/1945 | Mitchell | 64—29 |
| 3,035,675 | 5/1962 | Lill | 192—56 |
| 3,063,263 | 11/1962 | Bobst et al. | 64—29 |
| 3,185,275 | 5/1965 | Orwin | 192—64 |

DAVID J. WILLIAMOWSKY, *Primary Examiner.*

A. T. McKEON, *Assistant Examiner.*